US006582839B1

(12) United States Patent
Yamamoto et al.

(10) Patent No.: US 6,582,839 B1
(45) Date of Patent: Jun. 24, 2003

(54) ARTICLE WITH PHOTOCATALYTIC FILM

(75) Inventors: Hideki Yamamoto, Mie (JP); Seiji Yamazaki, Mie (JP); Yoshihiro Nishida, Mie (JP); Hiroshi Honjo, Mie (JP)

(73) Assignee: Central Glass Company, Limited, Ube (JP)

( * ) Notice: Subject to any disclaimer, the term of this patent is extended or adjusted under 35 U.S.C. 154(b) by 64 days.

(21) Appl. No.: 09/652,660

(22) Filed: Aug. 31, 2000

(30) Foreign Application Priority Data

Sep. 2, 1999 (JP) ............................................. 11-248155
Dec. 24, 1999 (JP) ............................................. 11-367121

(51) Int. Cl.⁷ ................................................. B32B 17/06
(52) U.S. Cl. ........................ 428/702; 428/323; 428/332; 428/334; 428/335; 428/336; 428/426; 428/428; 428/432; 428/446; 428/448; 428/688; 428/689; 428/697; 428/913
(58) Field of Search ................................. 428/428, 432, 428/448, 702, 323, 332, 334, 335, 336, 426, 446, 688, 689, 697, 913

(56) References Cited

FOREIGN PATENT DOCUMENTS

| EP | 0 911 300 | 4/1999 |
|----|-----------|--------|
| FR | 2 738 812 | 3/1997 |
| FR | 2 738 836 | 3/1997 |
| JP | 9-56788 | 3/1997 |
| JP | 9-227159 | 9/1997 |
| JP | 9-271731 | 10/1997 |
| JP | 9-328336 | 12/1997 |
| JP | 10-156999 | 6/1998 |
| JP | 10-216528 | 8/1998 |
| JP | 11-35342 | 2/1999 |

*Primary Examiner*—Deborah Jones
*Assistant Examiner*—Andrew T Piziali
(74) *Attorney, Agent, or Firm*—Crowell & Moring LLP

(57) ABSTRACT

The invention relates to an article having a substrate and photocatalytic film covering the substrate. This film contains (1) a film-forming component including $ZrO_2$ and $SiO_2$ and (2) $TiO_2$ crystals dispersed in the film-forming component. These $ZrO_2$, $SiO_2$ and $TiO_2$ crystals respectively are in amounts of 25–60 wt %, 15–50 wt % and 25–45 wt %, based on the weight of the film. The article is improved in photocatalytic activity, abrasion resistance and chemical resistance by the provision of the film.

29 Claims, No Drawings

ARTICLE WITH PHOTOCATALYTIC FILM

BACKGROUND OF THE INVENTION

The present invention relates to an article with a photocatalytic film, such as an automotive or architectural window pane. The article is provided with anti-fogging function, stain resistance, hydrophilicity and good visibility in rainy weather.

Japanese Patent Laid-open Publication JP-A-9-328336 discloses a composition for forming a photocatalytic film. This composition comprises (1) $TiO_2$ grains having an average grain diameter of less than 100 nm, (2) Zr-containing compound, and (3) Si-containing compound. The composition is such that the weight ratio of the Zr-containing compound to the $TiO_2$ grains is from 0.02 to 0.5 in terms of oxide and that the weight ratio of the Si-containing compound to the $TiO_2$ grains is from 0.2 to 2.5 in terms of oxide.

JP-A-10-216528 discloses a photocatalytic article comprising a substrate and a catalytic film formed thereon. This catalytic film is a combination of photocatalytic grains and a binder containing 60–90 wt % of silica and 10–40 wt % of zirconia.

JP-A-9-227159 discloses a vehicular front or rear window glass having a substantially transparent layer bonded to a substrate. This layer contains a photocatalytic semiconductor material.

JP-A-10-156999 discloses a photocatalytic layer made of a mixture of silica and titania. JP-A-9-271731 discloses a photocatalytic member having a top surface comprising titanium oxide and silicon oxide as major components. JP-A-9-56788 discloses an article for bathroom, having a photocatalytic layer made of a mixture of silica and titania.

JP-A-11-35342 discloses a multi-functional glass having a soda-lime glass substrate, a first layer formed on the substrate, and a second layer formed on the first layer. The first layer is a $SiO_2$ film containing at least one member selected from Ti and metal elements having electronegativities close to that of Ti. The second layer is a $TiO_2$ film or a $SiO_2$ film in which $TiO_2$ fine particles are dispersed.

SUMMARY OF THE INVENTION

It is an object of the present invention to provide an article with a photocatalytic film, which is improved in photocatalytic activity, abrasion resistance and chemical resistance.

It is another object of the present invention to provide a process for producing such article.

According to the present invention, there is provided an article comprising a substrate; and a photocatalytic film covering said substrate. This film comprises (1) a film-forming component comprising $ZrO_2$ and $SiO_2$ and (2) $TiO_2$ crystals dispersed in said film-forming component, said $ZrO_2$, said $SiO_2$ and said $TiO_2$ crystals respectively being in amounts of 25–60 wt %, 15–50 wt % and 25–45 wt %, based on a weight of said film.

According to the present invention, there is provided a first process for producing the article. The first process comprises (a) providing a coating liquid comprising a first raw material of said $ZrO_2$, a second raw material of said $SiO_2$, and a third raw material of said $TiO_2$ crystals; (b) applying said coating liquid to a surface of said substrate, thereby forming thereon a precursor film; and (c) subjecting said precursor film to a heat treatment at a temperature of 300–700° C., thereby turning said precursor film into said photocatalytic film.

According to the present invention, there is provided a second process for producing the article. The second process comprises (a) providing a coating liquid comprising a first raw material of said $ZrO_2$, a second raw material of said $SiO_2$, and a third raw material of said $TiO_2$ crystals; (b) applying said coating liquid to a surface of said substrate, thereby forming thereon a precursor film; and (c) subjecting said precursor film to a first baking at a temperature of 560–700° C., thereby turning said precursor film into said photocatalytic film.

DESCRIPTION OF THE PREFERRED EMBODIMENTS

We unexpectedly found that an article according to the invention is improved in photocatalytic activity (e.g., stain resistance and hydrophilicity), abrasion resistance and chemical resistance (e.g., acid resistance and alkali resistance) by specifying respective amounts of $ZrO_2$, $SiO_2$ and $TiO_2$ crystals as above, particularly by increasing the amount of $ZrO_2$ relative to that of $TiO_2$ crystals as above. For example, the obtained article becomes satisfactory in an alkali resistance test for Category A of Japanese Industrial Standard (JIS) R 3221 and thus can practically be used as an exterior window pane such as automotive or architectural window pane.

As stated above, the respective amounts of $ZrO_2$, $SiO_2$ and $TiO_2$ crystals are specified. Particularly, $TiO_2$ crystal fine grains, for example, having an average grain size of not greater than 30 nm, are preferably used as at least part of a raw material of $TiO_2$ crystals of the photocatalytic film. Due to these features, the photocatalytic film does not have cracks even if the baking of the precursor film is conducted at a high temperature at which a glass plate (substrate) can be bent into a curved glass plate. Generally speaking, such high temperature tends to make a photocatalytic film inferior in photocatalytic activity. According to the invention, however, the photocatalytic film does not become inferior in photocatalytic activity by such high temperature, due to the above features. Therefore, it is not necessary to provide an alkali barrier layer between the glass plate and the photocatalytic film for preventing the movement of alkali components of the glass plate into the photocatalytic film.

The total amount of $ZrO_2$, $SiO_2$ and the $TiO_2$ crystals of the photocatalytic film is preferably at least 90 wt %, based on the weight of the film, in order to have photocatalytic activity and durability such as abrasion resistance, acid resistance and alkali resistance. Besides these essential components, the film may optionally comprise not greater than 10 wt % of at least one component such as amorphous $TiO_2$, colloidal silica, other oxides (e.g., $Al_2O_3$, $B_2O_3$ and $SnO_2$), ions (Cr ion and V ion) and carbon. The $TiO_2$ crystals of the film may have an average grain size of not greater than 30 nm or not greater than 20 nm.

In case that the article is used as an automotive window pane, it is preferable to dispose the photocatalytic or hydrophilic film on an outer side of automobile.

In case that a glass plate is used as the substrate in the second process, the glass plate may be bent into a curved glass plate after the first baking or when the precursor film and the glass substrate are subjected to the first baking.

In order to improve the film in transparency and durability, the third raw material of the first process is preferably $TiO_2$ grains having an average grain size of not greater than 20 nm, and that of the second process is preferably those grains having an average grain size of not greater than 30 nm.

The first raw material of the first and second processes is preferably zirconium chloride or zirconium nitrate in order to improve the photocatalytic film in durability, particularly abrasion resistance, acid resistance and alkali resistance. Examples of the zirconium chloride include zirconium chloride, zirconium oxychloride octahydrate, and a chlorine-containing zirconium alkoxide represented by the general formula $Zr(OC_mH_{2m+1})_xCl_y$ where m, x and y are integers and x+y=4. Examples of the zirconium nitrate include zirconium oxynitrate dihydrate. The $ZrO_2$ content of the film is not lower than 25 wt % in order to have the film provided with alkali resistance and photocatalytic activity. If it is higher than 60 wt %, the film becomes inferior in abrasion resistance and/or photocatalytic activity. The $ZrO_2$ content of the film is preferably from 25 to 45 wt %. As $ZrO_2$ is added to the film, the film is improved in alkali resistance. Furthermore, the film is remarkably improved in photocatalytic activity if the $ZrO_2$ content of the film is not lower than 25 wt %.

The second raw material of the first and second processes is not particularly limited, so long as it can produce $SiO_2$ after the heat treatment or the first baking. Examples of the second raw material include alkoxysilanes such as tetramethoxysilane, tetraethoxysilane, methyltrimethoxysilane and methyltriethoxysilane, hydrolysates of these, polycondensates of these, those stabilized with stabilizers such as acetylacetone, and commercial products for producing $SiO_2$ such as COLCOAT P of COLCOAT Co., MSH2 of Mitsubishi Chemical Corp. and CSG-DI-0600 of Chisso Co. The $SiO_2$ content of the film is not lower than 15 wt % in order to have the film provided with abrasion resistance. If it is higher than 50 wt %, the film becomes inferior in photocatalytic activity and/or alkali resistance. The $SiO_2$ content of the film is preferably from 25 to 45 wt %.

The third raw material of the first and second processes is not particularly limited, so long as it can produce $TiO_2$ crystals after the heat treatment or the first baking. It is possible to use commercial powdery $TiO_2$ fine grains for photocatalyst, such as ST-01 and ST-21 of Ishihara Techno Co., SSP-25 and SSP-20 of SAKAI CHEMICAL INDUSTRY CO., LTD., PC-101 of Titan Kogyo K.K., SUPER TITANIA F-6 and SUPER TITANIA F-5 of Showa Titanium Co., and DN-22A of FURUKAWA CO., LTD. It is further possible to use liquid-type commercial products of the third raw material, such as STS-01 and STS-02 of Ishihara Techno Co. and A-6 and M-6 of TAKI CHEMICAL CO., LTD. It is still further possible to use a mixture of $TiO_2$ fine grains for photocatalyst and a raw material of silica, such as ST-K01 and ST-K03 (trade names) of Ishihara Techno Co. The $TiO_2$ crystal content of the film is not lower than 25 wt % in order to have a photocatalytic capability to achieve hydrophilicity and stain resistance. It is not greater than 45 wt % from the viewpoint of alkali resistance and abrasion resistance. Powdery $TiO_2$ fine grains can easily be dispersed in a coating liquid by a common mixing operation for dispersing a powder in a liquid, for example, using a ball mill. Upon this, it is optional to disperse the first raw material of $ZrO_2$ and the second raw material of $SiO_2$ in the coating liquid.

The manner of applying the coating liquid to the surface of a substrate is not particularly limited. It can be conducted by a common method such as dip coating, spin coating, roller coating, spraying, screen printing or the like.

In the first process, the precursory film is subjected to a heat treatment at a temperature of 300–700° C., thereby turning the precursory film into the photocatalytic film. Prior to this heat treatment, it is optional to conduct a drying at a temperature not higher than 200° C. or a preliminary baking at a temperature lower than that of the heat treatment. It is preferable to regulate the temperature of the heat treatment in a manner that a period of time, during which the heat treatment temperature lower than a maximum temperature of the heat treatment by 100° C. or less, is at least 1 minute, preferably at least 3 minutes. This maximum temperature can be arbitrarily set within a range of 300–700° C. The upper limit of the heat treatment time is not particularly limited. For example, a heat treatment time of 24 hr does not cause particular problems. The above-mentioned period of time is preferably about 2 hr from the viewpoint of productivity.

In the second process, the precursor film is subjected to a first baking at a temperature of 560–700° C., preferably 600–700° C., thereby turning the precursory film into the photocatalytic film. During the first baking, the substrate may be bent if it is necessary to produce a curved substrate. The film is provided with durability by the first baking. It is optional to conduct a second baking (preliminary baking) at a temperature of 300–620° C., preferably 450–620° C., prior to the first baking (main baking). A film becomes more compact and improved particularly in abrasion resistance by conducting these two bakings. In case that an automotive curved window pane is produced as the article of the invention, it is preferable to regulate the temperature of the first baking in a manner that a period of time, during which the first baking temperature lower than a maximum temperature of the first baking by 100° C. or less, is at least 1 minute, preferably at least 2 minutes. This maximum temperature can be arbitrarily set within a range of 560–700° C. The upper limit of the first baking time is not particularly limited. For example, the above-mentioned period of time is preferably about 3 minutes in case that a glass substrate is tempered by the first baking and preferably about 10 minutes in case that a glass substrate is bent during the first baking for producing a laminated glass. The $TiO_2$ crystals in the form of fine grains are dispersed in the film-forming component of the film, and the $TiO_2$ crystal content of the film is limited to a range of 25–45 wt %. With this, the film does not have cracks even if a glass substrate is bent during the first baking.

The film thickness is preferably from 30 to 500 nm in order to have photocatalytic activity and a high durability. It is more preferably from 50 to 300 nm in order to have a good transparency and a still high durability by the formation of a photocatalytic film one time. The material of the substrate is not particularly limited, as long as it does not deteriorate by heating. It may be selected from glass, ceramics and metals (e.g., aluminum and stainless steel). In particular, glass is preferable because of its transparency and heat resistance.

The article according to the invention is improved in durability, hydrophilicity, anti-fogging and stain resistance by the provision of the photocatalytic film. Thus, it can be used in various severe environments for building, vehicular, aircraft and industrial window panes, exterior tiles, exterior panels, showcases, and various mirrors such as vehicular door mirror and bathroom mirror. In particular, the article is preferably used for vehicular front, rear and side window panes. The article is improved in visibility under a rainy weather by the provision of hydrophilicity.

As mentioned above, the substrate can be a glass plate, for example, of a soda-lime-silicate glass. The glass plate is not limited to particular types. For examples, it may be a clear or colored glass plate having a color of blue, gray, bronze, green or the like, a glass reinforced with net or the like, a curved, semi-tempered or tempered glass, a double layer glass (sealed double-glazed unit) optionally having a metal film such as Low-E film, a double layer glass having a gel between two glass plates, a laminated glass, a glass plate pierced or formed on its uncoated side with a metal, oxide or resin film by deposition, sputtering, printing or the like, or a glass plate having an uncoated side subjected to etching, sand blasting or the like.

When the $TiO_2$ crystals of the photocatalytic film are irradiated with ultraviolet rays contained in the sunlight or a fluorescent light, organic contaminants on the film are oxidatively decomposed by the photocatalytic activity of the $TiO_2$ crystals. With this, the surface of the film becomes clean, and the surface of the $TiO_2$ crystals becomes hydrophilic. A film not according to the invention made of only $TiO_2$ crystals also becomes hydrophilic by its irradiation with ultraviolet rays. This film, however, becomes hydrophobic in a relatively short time due to the original hydrophobicity of $TiO_2$, if the irradiation is not repeated. In contrast, according to the invention, $SiO_2$ is added to the film. With this, the film is improved in hydrophilicity. Furthermore, a larger amount of water is adsorbed to the film, thereby improving the photocatalytic capability of the film. Still furthermore, the film is improved in durability such as abrasion resistance. According to the invention, $ZrO_2$ is added to the film. With this, the film is further improved in durability, particularly abrasion resistance and alkali resistance, and in photocatalytic capability. Thus, according to the invention, the photocatalytic film is very much improved in photocatalytic capability and durability, particularly abrasion resistance and alkali resistance. The surface of the photocatalytic film is kept hydrophilic. The film is capable of decomposing organic contaminants (e.g. organic components of exhaust gas and dust) by the photocatalytic activity. Furthermore, stain on the film runs down easily by rain water, since the film surface is kept hydrophilic. Furthermore, even if a glass plate used as the substrate is bent during the baking, the film does not have cracks and have a high quality and a high durability.

The following nonlimitative examples are illustrative of the present invention.

EXAMPLE 1-1

A coating liquid was prepared by dispersing, in a solvent that is a mixture of ethanol and 1-methoxy-2-propanol each being made of Kishida Chemical Co., (1) $ZrOCl_2$ of Kishida Chemical Co. as the raw material of $ZrO_2$, (2) CSG-DI-0600 (trade name) of Chisso Co., containing 6% of a siloxane oligomer in a mixture of ethanol and isopropanol, as the raw material of $SiO_2$, and (3) ST-K01 (trade name) of Ishihara Techno Co., in which the weight ratio of $TiO_2$ to $SiO_2$ is 8:2, in amounts such that the film contained 30 wt % of $ZrO_2$, 30 wt % of $SiO_2$ and 40 wt % of $TiO_2$. Separately, a float glass plate of soda-lime-silicate glass having widths of 100 mm and a thickness of 3 mm was washed sufficiently with water, detergent and ceria. This glass plate was used as the substrate. The coating liquid was applied to the surface of the glass plate by spin coating. The coated glass plate was dried for 20 minutes in a DK43-type air-circulating constant-temperature thermostat (made by Yamato Kagaku Co.) of 150° C., followed by a heat treatment for 10 minutes in a FP41-type muffle furnace (made by Yamato Kagaku Co.) of 650° C., thereby obtaining an article with a photocatalytic film having a thickness of 120 nm and containing 30 wt % of $ZrO_2$, 30 wt % of $SiO_2$ and 40 wt % of $TiO_2$, based on the weight of the film.

The obtained article (test sample) was subjected to the following abrasion resistance test, acid resistance test, alkali resistance test, photocatalytic activity test, and hydrophilicity test. The results of these tests are shown in Table 1. Of these, the evaluations of the abrasion resistance test, the acid resistance test and the alkali resistance test were conducted based on Category A of JIS R 3221.

The abrasion resistance test was conducted in accordance with JIS R 3221. The haze value was measured before and after an abrasion test. In this test, the test sample was rotated certain cycles relative to the Taber abraser having an abrasive wheel CS-10F, while the abrasive wheel is in abutment with the test sample under a load of 500 gf. In Table 1, "good" means that the haze value before the test $H_0$, the haze value after the 100 cycles $H_{100}$, and the haze value after the 200 cycles $H_{200}$ are in a relation of $H_0 \leq H_{100} \leq H_{200}$ and that $\Delta H$ is 4% or less where $\Delta H = H_{200} - H_0$. In Table 1, "not good" means that $H_{100}$ is greater than $H_{200}$ or $\Delta H$ is greater than 4%.

The acid resistance test was conducted in accordance with JIS R 3221. In this test, the test sample was immersed for 24 hr in 1N hydrochloric acid maintained at 23° C.±2° C. After that, the coated side of the test sample was wiped with a flannel cloth while a flowing water was applied to the test sample, followed by drying. Then, the external appearance of the test sample was observed with the naked eyes. In Table 1, "good" means that the film did not change substantially in its external appearance, and "not good" means that the film had a substantial coloration or scratches or that the film exfoliated.

The alkali resistance test was conducted in the same manner as that of the acid resistance test, except that In hydrochloric acid was replaced with 1N sodium hydroxide aqueous solution.

In the photocatalytic activity test, the photocatalytic activity of the test sample was evaluated by the degree of decomposition of stearic acid on the film due to the ultraviolet irradiation. In this test, the test sample was immersed in a solution containing 3 wt % of stearic acid dissolved in ethanol, and then withdrawn from the solution at a rate of 8 mm/sec. After that, the test sample was irradiated for 1 hr with ultraviolet rays from a black light, FL15BLB (trade name) of Toshiba Denki Co. in a manner to have a ultraviolet strength of 4 mW/cm$^2$ (365 nm) at the coated surface of the test sample. The amount of stearic acid on the film was determined by measuring a peak strength (absorbance A) appearing within a range of 2910–2920 cm$^{-1}$ and derived from the C—H stretching vibration of stearic acid, using a FT-IR spectrophotometer of Perkin-Elmer Co., Ltd., before and after the application of stearic acid and after the ultraviolet irradiation for 1 hr. Then, a peak strength change as the degree of stearic acid decomposition was determined by the expression $\{(A_0-A_b)-(A_1-A_b)\} \times 1000$ where $A_b$ is the peak strength before the application of stearic acid, $A_0$ is the peak strength after the application of stearic acid but before the ultraviolet irradiation, and $A_1$ is the peak strength after the ultraviolet irradiation for 1 hr. The results of the peak strength change are shown in Table 1. A peak strength change of 5 or greater was judged to be satisfactory, and that of less than 5 unsatisfactory.

The hydrophilicity test was conducted by allowing the test sample to stand still for 7 days in a laboratory of an environment having an ultraviolet strength not greater than 1 $\mu$W/cm$^2$ (365 nm). Then, a water drop was placed on the coated side of the test sample, and its contact angle was measured. In Table 1, "good" means that the contact angle was not greater than 20 degrees, and "not good" means that it was greater than 20 degrees.

A stain resistance test was conducted by allowing each test sample of Examples 1-1, 1-6 and 1-7 and a glass substrate itself to stand still in the outdoors. After that, the degree of stains on the coated side of the test sample and that on the glass substrate were checked with the naked eyes. With this, the former was found to be considerably less than the latter.

TABLE 1

|  | Abrasion Resistance | Acid Resistance | Alkali Resistance | Photocatalytic Activity | Hydrophilicity | Overall Evaluation |
|---|---|---|---|---|---|---|
| Example 1-1 | Good | Good | Good | 10 | Good | Good |
| Example 1-2 | Good | Good | Good | 19 | Good | Good |
| Example 1-3 | Good | Good | Good | 6 | Good | Good |
| Example 1-4 | Good | Good | Good | 8 | Good | Good |
| Example 1-5 | Good | Good | Good | 9 | Good | Good |
| Example 1-6 | Good | Good | Good | 32 | Good | Good |
| Example 1-7 | Good | Good | Good | 18 | Good | Good |
| Example 1-8 | Good | Good | Good | 8 | Good | Good |
| Com. Ex. 1-1 | Not good | Good | Not good | 48 | Good | Not good |
| Com. Ex. 1-2 | Good | Good | Not good | 3 | Good | Not good |
| Com. Ex. 1-3 | Good | Good | Not good | 4 | Good | Not good |
| Com. Ex. 1-4 | Not good | Good | Good | 20 | Good | Not good |
| Com. Ex. 1-5 | Good | Good | Good | 2 | Good | Not good |
| Com. Ex. 1-6 | Good | Good | Good | 3 | Good | Not good |
| Com. Ex. 1-7 | Not good | Good | Good | 21 | Good | Not good |
| Com. Ex. 1-8 | Good | Good | Good | 0 | Not good | Not good |
| Com. Ex. 1-9 | Good | Good | Good | 0 | Not good | Not good |
| Com. Ex. 1-10 | Good | Good | Not good | 20 | Good | Not good |

EXAMPLE 1-2

Example 1-1 was repeated except in that a coating liquid was prepared such that the film contained 40 wt % of $ZrO_2$, 20 wt % of $SiO_2$ and 40 wt % of $TiO_2$.

EXAMPLE 1-3

Example 1-1 was repeated except in that a coating liquid was prepared such that the film contained 30 wt % of $ZrO_2$, 40 wt % of $SiO_2$ and 30 wt % of $TiO_2$ and that the film had a thickness of 150 nm.

EXAMPLE 1-4

Example 1-1 was repeated except in that a coating liquid was prepared such that the film contained 50 wt % of $ZrO_2$, 20 wt % of $SiO_2$ and 30 wt % of $TiO_2$ and that the film had a thickness of 150 nm.

EXAMPLE 1-5

Example 1-1 was repeated except in that a mixture was prepared by dispersing in ethanol MSH2 (trade name) of Mitsubishi Chemical Corp. containing a polymethoxysiloxane as the raw material of $SiO_2$ and PC-101 (trade name) of Titan Kogyo K.K. as the raw material of the $TiO_2$ crystals, using a ball mill, and then $Zr(OC_4H_9)_3Cl$ as the raw material of $ZrO_2$ was added to the mixture, thereby preparing a coating liquid.

EXAMPLE 1-6

Example 1-1 was repeated except in that the coating liquid was applied by dip coating to the surface of a glass plate that is the same as that of Example 1-1, and then the coated glass plate was subjected to a heat treatment by putting it for 40 minutes in a FP41-type muffle furnace of Yamato Kagaku Co. of 450° C., thereby forming a film having a thickness of 80 nm.

EXAMPLE 1-7

Example 1-3 was repeated except in that the coating liquid was applied by dip coating to the surface of a glass plate that is the same as that of Example 1-1, and then the coated glass plate was subjected to a heat treatment by putting it for 40 minutes in a FP41-type muffle furnace of Yamato Kagaku Co. of 450° C.

EXAMPLE 1-8

Example 1-1 was repeated except in that a coating liquid was prepared by adding aluminum nitrate of Kishida Chemical Co. as the raw material of $Al_2O_3$ to the coating liquid of Example 1-1 such that the film contained 30 wt % of $ZrO_2$, 5 wt % of $Al_2O_3$, 25 wt % of $SiO_2$ and 40 wt % of $TiO_2$.

Comparative Example 1-1

Example 1-1 was repeated except in that a coating liquid was prepared by dispersing only ST-K01 (trade name) of Ishihara Techno Co. in a mixture of ethanol and 1-methoxy-2-propanol each being made of Kishida Chemical Co. such that the film contained 20 wt % of $SiO_2$ and 80 wt % of $TiO_2$.

Comparative Example 1-2

Example 1-1 was repeated except in that a coating liquid was prepared by dispersing only ST-K03 (trade name) of Ishihara Techno Co., in which the weight ratio of $TiO_2$ to $SiO_2$ is 5:5, in a mixture of ethanol and 1-methoxy-2-propanol each being made of Kishida Chemical Co. such that the film contained 50 wt % of $SiO_2$ and 50 wt % of $TiO_2$.

Comparative Example 1-3

Example 1-1 was repeated except in that a coating liquid was prepared such that the film contained 10 wt % of $ZrO_2$, 40 wt % of $SiO_2$ and 50 wt % of $TiO_2$.

Comparative Example 1-4

Example 1-1 was repeated except in that a coating liquid was prepared such that the film contained 30 wt % of $ZrO_2$, 20 wt % of $SiO_2$ and 50 wt % of $TiO_2$.

Comparative Example 1-5

Example 1-1 was repeated except in that a coating liquid was prepared such that the film contained 10 wt % of $ZrO_2$, 50 wt % of $SiO_2$ and 40 wt % of $TiO_2$.

Comparative Example 1-6

Example 1-1 was repeated except in that a coating liquid was prepared such that the film contained 20 wt % of $ZrO_2$, 40 wt % of $SiO_2$ and 40 wt % of $TiO_2$.

Comparative Example 1-7

Example 1-1 was repeated except in that a coating liquid was prepared such that the film contained 50 wt % of $ZrO_2$, 10 wt % of $SiO_2$ and 40 wt % of $TiO_2$.

Comparative Example 1-8

Example 1-1 was repeated except in that a coating liquid was prepared such that the film contained 10 wt % of $ZrO_2$, 70 wt % of $SiO_2$ and 20 wt % of $TiO_2$.

Comparative Example 1-9

Example 1-1 was repeated except in that a coating liquid was prepared such that the film contained 30 wt % of $ZrO_2$, 50 wt % of $SiO_2$ and 20 wt % of $TiO_2$.

Comparative Example 1-10

Example 1-1 was repeated except that a coating liquid was prepared by mixing (1) CSG-DI-0600 (trade name) of Chisso Co. as the raw material of $SiO_2$, (2) ST-K01 (trade name) of Ishihara Techno Co., in which the weight ratio of $TiO_2$ to $SiO_2$ is 8:2, as the raw material of $TiO_2$ crystals and $SiO_2$, and (3) a liquid containing $Ti(OC_3H_7)_4$ which has been dissolved in ethanol and stabilized with an equimolar amount of acetylacetone, with a mixture of ethanol and 1-methoxy-2-propanol each being made by Kishida Chemical Co. such that the film contained 30 wt % of $TiO_2$ derived from $Ti(OC_3H_7)_4$, 30 wt % of $SiO_2$ and 40 wt % of $TiO_2$ derived from ST-K01.

EXAMPLE 2-1

A coating liquid was prepared in the same manner as that of Example 1-1. Separately, a float glass plate of soda-lime-silicate glass having dimensions of 1,000 mm, 1,800 mm and 3.5 mm (thickness) was sufficiently washed with water, detergent and ceria. Then, the coating liquid was applied to the glass plate by dip coating, followed by a preliminary baking at 600° C. for 5 minutes. Then, the coated glass plate was cut into a predetermined shape, then subjected to several preliminary treatments, such as seaming (chamfering), the application of a black paint to the periphery, a heating wire printing and the like, and then subjected to a main baking at 650° C., thereby obtaining an article of the invention, that is, an automotive rear window glass pane with a photocatalytic film having a thickness of 120 nm and a composition of 30 wt % of $ZrO_2$, 30 wt % of $SiO_2$ and 40 wt % of $TiO_2$, based on the weight of this film. During the main baking, the glass plate was bent into a curved shape.

The obtained article (test sample) was subjected to the following evaluation tests. The results of the tests are shown in Table 2.

An abrasion resistance test was conducted in the same manner as that of Example 1-1. In Table 2, "good" means that the haze value before the test $H_0$ is 1% or less, and $\Delta H$ is 2% or less where $\Delta H = H_{max} - H_0$ in which $H_{max}$ is the maximum haze value during 1,000 cycles. In Table 2, "not good" means that $H_0$ is greater than 1% or $\Delta H$ is greater than 2%.

An acid resistance test was conducted in the same manner as that of Example 1-1, except in that 1N hydrochloric acid was replaced with 1 wt % sulfuric acid. The evaluation was conducted in the same manner as that of Example 1-1.

An alkali resistance test was conducted in the same manner as that of Example 1-1, except in that 1N sodium hydroxide aqueous solution was replaced with 1 wt % sodium hydroxide aqueous solution. The evaluation was conducted in the same manner as that of Example 1-1.

A photocatalytic activity test and its evaluation were conducted in the same manners as those of Example 1-1.

A hydrophilicity test and its evaluation were conducted in the same manners as those of Example 1-1.

A stain resistance test was conducted by allowing the test sample of Example 2-1 and an automotive rear window glass having no photocatalytic film thereon to stand still in the outdoors. After that, the degree of stains on the coated side of the test sample and that on the automotive rear window glass were checked with the naked eyes. With this, the former was found to be considerably less than the latter.

TABLE 2

|  | Abrasion Resistance | Acid Resistance | Alkali Resistance | Photocatalytic Activity | Hydrophilicity | Overall Evaluation |
| --- | --- | --- | --- | --- | --- | --- |
| Example 2-1 | Good | Good | Good | 14 | Good | Good |
| Example 2-2 | Good | Good | Good | 19 | Good | Good |
| Example 2-3 | Good | Good | Good | 6 | Good | Good |
| Example 2-4 | Good | Good | Good | 8 | Good | Good |
| Example 2-5 | Good | Good | Good | 9 | Good | Good |
| Example 2-6 | Good | Good | Good | 8 | Good | Good |
| Com. Ex. 2-1 | Not good | Good | Not good | 48 | Good | Not good |
| Com. Ex. 2-2 | Good | Good | Not good | 3 | Good | Not good |
| Com. Ex. 2-3 | Good | Good | Not good | 4 | Good | Not good |
| Com. Ex. 2-4 | Not good | Good | Good | 20 | Good | Not good |
| Com. Ex. 2-5 | Good | Goo& | Good | 2 | Good | Not good |
| Com. Ex. 2-6 | Good | Good | Good | 3 | Good | Not good |
| Com. Ex. 2-7 | Not good | Good | Good | 21 | Good | Not good |
| Com. Ex. 2-8 | Good | Good | Good | 0 | Not good | Not good |
| Com. Ex. 2-9 | Good | Good | Good | 0 | Not good | Not good |
| Com. Ex. 2-10 | Good | Good | Not good | 20 | Good | Not good |

EXAMPLE 2-2

Example 2-1 was repeated except in that a coating liquid was prepared such that the film contained 40 wt % of $ZrO_2$, 20 wt % of $SiO_2$ and 40 wt % of $TiO_2$.

EXAMPLE 2-3

Example 2-1 was repeated except in that a coating liquid was prepared such that the film contained 30 wt % of $ZrO_2$, 40 wt % of $SiO_2$ and 30 wt % of $TiO_2$ and that the film had a thickness of 150 nm.

EXAMPLE 2-4

Example 2-1 was repeated except in that a coating liquid was prepared such that the film contained 50 wt % of $ZrO_2$, 20 wt % of $SiO_2$ and 30 wt % of $TiO_2$ and that the film had a thickness of 150 nm.

EXAMPLE 2-5

Example 2-1 was repeated except in that a mixture was prepared by dispersing in ethanol MSH2 (trade name) of Mitsubishi Chemical Corp. as the raw material of $SiO_2$ and PC-101 (trade name) of Titan Kogyo K.K. as the raw material of the $TiO_2$ crystals, using a ball mill, and then $Zr(OC_4H_9)_3Cl$ as the raw material of $ZrO_2$ was added to the mixture, thereby preparing a coating liquid.

EXAMPLE 2-6

Example 2-1 was repeated except in that a coating liquid was prepared by adding aluminum nitrate of Kishida Chemical Co. as the raw material of $Al_2O_3$ to the coating liquid of Example 1-1 such that the film contained 30 wt % of $ZrO_2$, 5 wt % of $Al_2O_3$, 25 wt % of $SiO_2$ and 40 wt % of $TiO_2$.

Comparative Example 2-1

Example 2-1 was repeated except in that a coating liquid was prepared by dispersing only ST-K01 (trade name) of Ishihara Techno Co. in a mixture of ethanol and 1-methoxy-2-propanol each being made of Kishida Chemical Co. such that the film contained 20 wt % of $SiO_2$ and 80 wt % of $TiO_2$.

Comparative Example 2-2

Example 2-1 was repeated except in that a coating liquid was prepared by dispersing only ST-K03 (trade name) of Ishihara Techno Co., in which the weight ratio of $TiO_2$ to $SiO_2$ is 5:5, in a mixture of ethanol and 1-methoxy-2-propanol each being made of Kishida Chemical Co. such that the film contained 50 wt % of $SiO_2$ and 50 wt % of $TiO_2$.

Comparative Example 2-3

Example 2-1 was repeated except in that a coating liquid was prepared such that the film contained 10 wt % of $ZrO_2$, 40 wt % of $SiO_2$ and 50 wt % of $TiO_2$.

Comparative Example 2-4

Example 2-1 was repeated except in that a coating liquid was prepared such that the film contained 30 wt % of $ZrO_2$, 20 wt % of $SiO_2$ and 50 wt % of $TiO_2$.

Comparative Example 2-5

Example 2-1 was repeated except in that a coating liquid was prepared such that the film contained 10 wt % of $ZrO_2$, 50 wt % of $SiO_2$ and 40 wt % of $TiO_2$.

Comparative Example 2-6

Example 2-1 was repeated except in that a coating liquid was prepared such that the film contained 20 wt % of $ZrO_2$, 40 wt % of $SiO_2$ and 40 wt % of $TiO_2$.

Comparative Example 2-7

Example 2-1 was repeated except in that a coating liquid was prepared such that the film contained 50 wt % of $ZrO_2$, 10 wt % of $SiO_2$ and 40 wt % of $TiO_2$.

Comparative Example 2-8

Example 2-1 was repeated except in that a coating liquid was prepared such that the film contained 10 wt % of $ZrO_2$, 70 wt % of $SiO_2$ and 20 wt % of $TiO_2$.

Comparative Example 2-9

Example 2-1 was repeated except in that a coating liquid was prepared such that the film contained 30 wt % of $ZrO_2$, 50 wt % of $SiO_2$ and 20 wt % of $TiO_2$.

Comparative Example 2-10

Example 2-1 was repeated except that a coating liquid was prepared by mixing (1) CSG-DI-0600 (trade name) of Chisso Co. as the raw material of $SiO_2$, (2) ST-K01 (trade name) of Ishihara Techno Co., in which the weight ratio of $TiO_2$ to $SiO_2$ is 8:2, as the raw material of $TiO_2$ crystals and $SiO_2$, and (3) a liquid containing $Ti(OC_3H_7)_4$ which has been dissolved in ethanol and stabilized with an equimolar amount of acetylacetone, with a mixture of ethanol and 1-methoxy-2-propanol each being made by Kishida Chemical Co. such that the film contained 30 wt % of $TiO_2$ derived from $Ti(OC_3H_7)_4$, 30 wt % of $SiO_2$ and 40 wt % of $TiO_2$ derived from ST-K01.

The entire disclosure of each of Japanese Patent Application Nos. 11-248155 filed on Sep. 2, 1999 and 11-367121 filed on Dec. 24, 1999, including specification, claims and summary, is incorporated herein by reference in its entirety.

What is claimed is:

1. An article comprising:
    a substrate; and
    a photocatalytic film covering said substrate, said film comprising (1) a film-forming component comprising $ZrO_2$ and $SiO_2$ and (2) $TiO_2$ crystals dispersed in said film-forming component, said $ZrO_2$, said $SiO_2$ and said $TiO_2$ crystals respectively being in amounts of 30–60 wt %, 15–45 wt % and 25–45 wt %, based on a weight of said film.

2. An article according to claim 1, wherein a total amount of said $ZrO_2$, said $SiO_2$ and said $TiO_2$ crystals is at least 90 wt %, based on the weight of said film.

3. An article according to claim 1, wherein said film has a thickness of from 50 to 300 nm.

4. An article according to claim 1, wherein said $ZrO_2$ is in an amount of 30–45 wt %, based on the weight of said film.

5. An article according to claim 1, wherein said $SiO_2$ is in an amount of 25–45 wt %, based on the weight of said film.

6. An article according to claim 1, wherein said $TiO_2$ crystals have an average grain size of not greater than 30 nm.

7. An article according to claim 6, wherein said average grain size is not greater than 20 nm.

8. An article according to claim 1, wherein said substrate is a curved glass plate.

9. An article according to claim 1, wherein said article is an automotive window pane having said photocatalytic film on an outer side thereof.

10. An article according to claim 1, wherein said film further comprises at least one member selected from the group consisting of amorphous $TiO_2$, colloidal silica, $Al_2O_3$, $B_2O_3$, $SnO_2$, Cr ion, V ion, and carbon.

11. An article according to claim 1, wherein said article is produced by a process comprising:

providing a coating liquid comprising a first raw material of said $ZrO_2$, a second raw material of said $SiO_2$, and a third raw material of said $TiO_2$ crystals;

applying said coating liquid to a surface of said substrate, thereby forming thereon a precursory film; and subjecting said precursory film to a heat treatment at a temperature of 300–700° C., thereby turning said precursory film into said photocatalytic film.

12. An article according to claim 11, wherein said third raw material is $TiO_2$ crystal grains having an average grain size of not greater than 20 nm.

13. An article according to claim 11, wherein said first raw material is zirconium chloride or zirconium nitrate.

14. An article according to claim 1, wherein said article is produced by a process comprising:

providing a coating liquid comprising a first raw material of said $ZrO_2$, a second raw material of said $SiO_2$, and a third raw material of said $TiO_2$ crystals;

applying said coating liquid to a surface of said substrate, thereby forming thereon a precursory film; and subjecting said precursory film to a first baking at a temperature of 560–700° C., thereby turning said precursory film into said photocatalytic film.

15. An article according to claim 14, wherein said substrate is a glass plate, and wherein said glass plate is bent into a curved glass plate when said precursory film and said glass plate are subjected to said first baking.

16. An article according to claim 14, wherein said substrate is a glass plate, and wherein said glass plate is bent into a curved glass plate after said first baking.

17. An article according to claim 14, wherein, prior to said first baking, said precursory film is subjected to a second baking at a temperature of 300–620° C.

18. An article according to claim 14, wherein said third raw material is $TiO_2$ crystal grains having an average grain size of not greater than 30 nm.

19. An article according to claim 14, wherein said first raw material is zirconium chloride or zirconium nitrate.

20. A process for producing an article, said article comprising:

a substrate; and a photocatalytic film covering said substrate, said film comprising (1) a film-forming component comprising $ZrO_2$ and $SiO_2$ and (2) $TiO_2$ crystals dispersed in said film-forming component, said $ZrO_2$, said $SiO_2$ and said $TiO_2$ crystals respectively being in amounts of 30–60 wt %, 15–45 wt % and 25–45 wt %, based on a weight of said film, said process comprising:

providing a coating liquid comprising a first raw material of said $ZrO_2$, a second raw material of said $SiO_2$, and a third raw material of said $TiO_2$ crystals;

applying said coating liquid to a surface of said substrate, thereby forming thereon a precursory film; and subjecting said precursory film to a heat treatment at a temperature of 300–700° C., thereby turning said precursory film into said photocatalytic film.

21. A process according to claim 20, wherein said third raw material is $TiO_2$ crystal grains having an average grain size of not greater than 20 nm.

22. A process according to claim 20, wherein said first raw material is zirconium chloride or zirconium nitrate.

23. A process for producing an article, said article comprising:

a substrate; and a photocatalytic film covering said substrate, said film comprising (1) a film-forming component comprising $ZrO_2$ and $SiO_2$ and (2) $TiO_2$ crystals dispersed in said film-forming component, said $ZrO_2$, said $SiO_2$ and said $TiO_2$ crystals respectively being in amounts of 30–60 wt %, 15–45 wt % and 25–45 wt %, based on a weight of said film, said process comprising:

providing a coating liquid comprising a first raw material of said $ZrO_2$, a second raw material of said $SiO_2$, and a third raw material of said $TiO_2$ crystals;

applying said coating liquid to a surface of said substrate, thereby forming thereon a precursory film; and subjecting said precursory film to a first baking at a temperature of 560–700° C., thereby turning said precursory film into said photocatalytic film.

24. A process according to claim 23, wherein said substrate is a glass plate, and wherein said glass plate is bent into a curved glass plate when said precursory film and said glass plate are subjected to said first baking.

25. A process according to claim 23, wherein said substrate is a glass plate, and wherein said glass plate is bent into a curved glass plate after said first baking.

26. A process according to claim 23, wherein, prior to said first baking, said precursory film is subjected to a second baking at a temperature of 300–620° C.

27. A process according to claim 23, wherein said third raw material is $TiO_2$ crystal grains having an average grain size of not greater than 30 nm.

28. A process according to claim 23, wherein said first raw material is zirconium chloride or zirconium nitrate.

29. An article according to claim 1, wherein said $ZrO_2$ is in amount of 30–50 wt %, based on the weight of said film.

* * * * *